United States Patent [19]

Fukui et al.

[11] 4,439,573
[45] Mar. 27, 1984

[54] PROPYLENE POLYMER COMPOSITION

[75] Inventors: Osamu Fukui, Toyonaka; Yoshiro Umemoto, Nagoya; Tsugumi Sanmiya, Toyota; Yutaka Sano, Kishiwada; Kazuyoshi Tanaka, Sakai, all of Japan

[73] Assignees: UBE Industries; Toyota Jidosha Kabushiki Kaisha, both of Osaka, Japan

[21] Appl. No.: 452,725

[22] Filed: Dec. 23, 1982

[30] Foreign Application Priority Data

Dec. 25, 1981 [JP] Japan ................................ 56-209173

[51] Int. Cl.$^3$ ................................................ C08K 3/34
[52] U.S. Cl. ...................................... 524/451; 524/505
[58] Field of Search ................................ 524/451, 505

[56] References Cited

U.S. PATENT DOCUMENTS 4,363,885 12/1982 Fukui et al. .......................... 523/212

Primary Examiner—Melvyn I. Marquis
Assistant Examiner—H. Lilling
Attorney, Agent, or Firm—Burgess, Ryan & Wayne

[57] ABSTRACT

A polypropylene composition useful for producing a shaped article, for example, a bumper, having excellent rigidity, resistance to mechanical impact at a low temperature and superior lacquer-bonding property and appearance, comprises:

(A) 40% to 75% by weight of at least one crystalline ethylene-propylene block copolymer in which the content of the polymerized ethylene is in the range of from 5% to 10% by weight, in which the polypropylene component has a fraction thereof insoluble in boiling n-heptane, in an amount of 97% or more, in which a fraction of the block copolymer soluble in p-xylene at room temperature, has an intrinsic viscosity of from 2.5 to 4 determined in decahydronaphthalene at a temperature of 135° C. and which has a melt flow index of from 11 to 70;

(B) 20% to 40% by weight of at least one amorphous ethylene-propylene copolymer having an intrinsic viscosity of from 1.0 to 2.0 determined in decahydronaphthalene at a temperature of 135° C., and a Mooney viscosity $ML_{1+4}$ of from 5 to 40 determined at a temperature of 100° C.; and (C) 5% to 20% by weight of talc in the form of fine particles having an average size of from 0.1 to 5 microns.

6 Claims, No Drawings

PROPYLENE POLYMER COMPOSITION

BACKGROUND OF THE INVENTION

1. Field of the Invention

The present invention relates to a propylene polymer composition. More particularly, the present invention relates to a propylene polymer composition having excellent moldability and which is useful for producing shaped articles, for example, bumpers, having excellent lacquer-bonding property, excellent resistance to mechanical impact, and satisfactory appearance.

2. Description of the Prior Art

Generally, it is known that conventional crystalline propylene polymers exhibit excellent rigidity, satisfactory resistance to thermal deformation, and satisfactory surface hardness. However, it is also known that the conventional crystalline propylene polymers exhibit not only poor mechanical properties at low temperature but also poor resistance to mechanical impact applied thereto and poor lacquer-bonding property due to the non-polarity of the copolymers. Accordingly, it has been found that the conventional crystalline propylene polymers are unsatisfactory as material for making articles having all the properties of excellent rigidity, satisfactory resistance to thermal deformation, excellent resistance to mechanical impact, and excellent lacquer-bonding property.

In order to enhance the resistance to mechanical impact at a low temperature and to enhance the lacquer-bonding property of the crystalline propylene polymers, it was attempted to blend a crystalline ethylene-propylene block copolymer with an amorphous ethylene-propylene copolymer alone or a mixture of the amorphous ethylene-propylene copolymer with various types of polyethylene.

However, in this attempt, it was found that the above-mentioned modes of blends caused the resultant copolymer blends to exhibit lower rigidity and resistance to thermal deformation than those of the crystalline ethylene-propylene block copolymers.

In order to improve the conventional propylene polymer compositions, Japanese Unexamined Pat. Publication (Kokai) No. 53-64257 (1978) discloses a resinous composition having a high impact resistance. The publication describes the resinous composition comprising a blend of a crystalline ethylene-propylene block copolymer with an amorphous ethylene-alpha-olefin copolymer and talc and being capable of providing a shaped article having significantly enhanced impact resistance at low temperature, rigidity, and lacquer-bonding property in comparison with conventional crystalline ethylene-propylene block copolymers.

The above-mentioned publication also describes various examples of polymeric compositions comprising, as a polymeric component, a crystalline ethylene-propylene block copolymer having a melt flow index of 1.5, ethylene-propylene-non-conjugated diene copolymer having a melt flow index of 0.4, or amorphous ethylene-propylene copolymer having a melt flow index of 0.8. All of the above-mentioned polymers have a very high molecular weight. Accordingly, the polymeric composition of the above-mentioned publication is very useful for producing therefrom shaped articles having excellent rigidity, resistance to thermal deformation, and impact resistance. However, the polymeric composition is disadvantageous in that the resultant shaped articles tend to have undesirable flow marks formed thereon, resulting in an unsatisfactory appearance, and exhibit an unsatisfactory lacquer-bonding property. Therefore, the resultant shaped articles can only be used in special fields in which the appearance of the articles is not important and are not suitable for use as parts, particularly, bumpers, of cars, the satisfactory appearance of which is just as important as the mechanical properties thereof.

That is, the prior art failed to obtain shaped articles having not only satisfactory rigidity and impact resistance but also superior lacquer-bonding property and appearance by molding conventional crystalline ethylene-propylene block copolymers.

SUMMARY OF THE INVENTION

The object of the present invention is to provide a propylene polymer composition useful for making shaped articles having both excellent rigidity and resistance to mechanical impact at a low temperature together with a satisfactory resistance to thermal deformation, an enhanced lacquer-bonding property and a satisfactory appearance.

The above-mentioned object can be attained by the propylene polymer composition of the present invention, which comprises:

(A) 40% to 75% by weight of at least one crystalline ethylene-propylene block copolymer in which the content of the polymerized ethylene is in the range of from 5% to 10% by weight, in which the polypropylene component has a fraction thereof insoluble in boiling n-heptane, in an amount of 97% or more based on the weight of the polypropylene component, in which a fraction thereof, soluble in p-xylene at room temperature, has an intrinsic viscosity of from 2.5 to 4 determined in decahydronaphthalene at a temperature of 135° C. and which has a melt flow index of from 11 to 70;

(B) 20% to 40% by weight of at least one amorphous ethylene-propylene copolymer having an intrinsic viscosity of from 1.0 to 2.0 determined in decahydronaphthalene at a temperature of 135° C., and a Mooney viscosity $ML_{1+4}$ of from 5 to 40 determined at a temperature of 100° C.; and (C) 5% to 20% by weight of talc in the form of fine particles having an average size of from 0.1 to 5 microns.

DETAILED DESCRIPTION OF THE INVENTION

The propylene polymer composition of the present invention can provide shaped articles having a modulus of elasticity in bending of 8000 kg/cm² or more, an Izot impact strength of 5 kg·cm/cm or more at a temperature of −30° C., and a lacquer-retaining percentage of 100 in the cross cut test which will be explained hereinafter in detail. The shaped articles made of the propylene polymer composition of the present invention are also free from undesirable flow marks formed thereon and have a satisfactory appearance.

That is, the propylene polymer composition of the present invention can be molded into shaped articles having significantly enhanced resistance to mechanical impact at a low temperature, lacquer-bonding property, and appearance together with satisfactory rigidity and resistance to thermal deformation, which are inherent properties of the crystalline ethylene-propylene block copolymers. Especially, it should be noted that when the propylene polymer composition of the present invention is molded to form a large shaped article having, for example, a length of 1 meter or more, the resultant article has no flow mark formed thereon, is provided with a glossy surface thereof, and exhibits a satisfactory appearance. Accordingly, the propylene polymer composition of the present invention can be advantageously used to provide high grade bumpers. Also, it should be noted that the propylene polymer composition of the present invention has a melt flow index of 7 or more and, therefore, exhibits the same as or superior molding and processing properties to those of conventional propylene polymer compositions consisting of a conventional blend of a crystalline ethylene-propylene block copolymer, an amorphous ethylene-propylene copolymer, and talc.

In the propylene polymer composition of the present invention, at least one crystalline ethylene-propylene block copolymer is used in an amount of from 40% to 75% by weight preferably, from 45% to 70% by weight. That is, the crystalline block copolymer may be used in one single phase or in the form of a mixture of two or more copolymers, as long as the total content of the two or more copolymers is in the range of 40% to 75% by weight.

If the content of the crystalline block copolymer is less than 40% by weight, the resultant propylene polymer composition imparts a shaped article made therefrom with an unsatisfactory modulus of elasticity in bending of less than 8000 kg/cm². The content of the crystalline block copolymer of more than 75% by weight causes a shaped article made from the resultant propylene polymer composition to exhibit an unsatisfactory mechanical impact resistance at a low temperature, for example, of $-30°$ C.

In the crystalline ethylene-propylene block copolymer used for the present invention, the content of polymerized ethylene is in the range of from 5% to 10% by weight; the polypropylene component contains a fraction thereof insoluble in boiling n-heptane, in an amount of 97% by weight or more, and a fraction of the block copolymer soluble in p-xylene at room temperature exhibits an intrinsic viscosity of from 2.5 to 4 determined in decahydronaphthalene at a temperature of 135° C. Also, the block copolymer exhibits a melt flow index of from 11 to 70, preferably, 12 to 50.

The term "a fraction of the polypropylene component insoluble in boiling n-heptane" used herein, refers to a fraction in the polypropylene (matrix) component used for preparing the crystalline ethylene-propylene block copolymer, which fraction is insoluble in boiling n-heptane.

As stated above, the content of the polymerized ethylene in the crystalline block copolymer must be in the range of from 5% to 10% by weight. If the content of ethylene is less than 5% by weight, the resultant propylene polymer composition causes a shaped article made therefrom to exhibit a poor resistance to mechanical impact at a low temperature and an unsatisfactory lacquer-bonding property. Also, the content of ethylene of more than 10% by weight causes the resultant shaped article to exhibit a decreased rigidity. Also, it is necessary that the content of the boiling n-heptane-insoluble fraction in the polypropylene component be 97% by weight or more. If the content of the fraction is less than 97% by weight, the resultant propylene polymer composition causes a shaped article made from the composition to exhibit an unsatisfactory modulus of elasticity in bending of less than 8000 kg/cm².

In the crystalline block copolymer, the fraction thereof soluble in p-xylene at an ambient temperature must exhibit an intrinsic viscosity of 2.5 to 4 determined in decahydronaphthalene at 135° C. If the intrinsic viscosity of the p-xylene soluble fraction is less than 2.5, the resultant propylene polymer composition causes a shaped article made from the composition to exhibit an unsatisfactory Izot impact strength of less than 5 kg·cm/cm at a temperature of $-30°$ C. Also, if the intrinsic viscosity of the p-xylene-soluble fraction is more than 4, the resultant propylene polymer composition causes a shaped article made therefrom to exhibit a poor lacquer-bonding property, that is, a lacquer-retaining percentage less than 100 in the cross cut test.

The melt flow index of the crystalline block copolymer should be in the range of from 11 to 70. A melt flow index of less than 11 causes the resultant propylene polymer composition to exhibit a poor shaping property. Therefore, it is difficult to produce a shaped article, especially, a large shaped article, having a satisfactory appearance in a satisfactory molding-processability. Also, a melt flow index of more than 70 results in a poor resistance to impact of a shaped article made from the resultant propylene polymer composition.

In the case where the above-mentioned requirements for the crystalline ethylene-propylene block copolymer are not satisfied, the resultant propylene polymer composition fails to provide a shaped article having satisfactory rigidity and resistance to thermal deformation along with excellent resistance to mechanical impact at a low temperature, lacquer-bonding property, and satisfactory appearance.

The amorphous ethylene-propylene copolymer contained in the propylene polymer composition of the present invention has an intrinsic viscosity of from 1.0 to 2.0, preferably, from 1.2 to 1.7, determined in decahydronaphthalene at 135° C. and a Mooney viscosity $ML_{1+4}$ (100° C.) of from 5 to 40, preferably, from 10 to 40. The signal "$ML_{1+4}$ (100° C.)" refers to a Mooney viscosity measured by maintaining a material to be tested at a temperature of 100° C. for 4 minutes after preheating it to 100° C. for one minute and by using a Mooney Plastometer equipped with a large rotor.

When the amorphous copolymer has a melt flow index of less than 1.0, and/or a Mooney viscosity of less than 5, the resultant shaped article exhibits an unsatisfactory resistance to mechanical impact at a low temperature. If the intrinsic viscosity is more than 2.0, and/or the Mooney viscosity is more than 40, the resultant amorphous copolymer exhibits a poor compatibility with the crystalline copolymer having the above-mentioned large melt flow index and the resultant shaped article exhibits a poor lacquer-bonding property and an unsatisfactory appearance.

The content of the amorphous ethylene-propylene copolymer in the propylene polymer composition of the present invention is in the range of from 20% to 40% by weight, preferably, from 20% to 35% by weight. The content of the amorphous copolymer of less than 20% by weight causes the resultant shaped article to exhibit an unsatisfactory resistance to mechanical impact at a low temperature and a poor lacquer-bonding property. A content of the amorphous copolymer of more than 40% by weight results in an unsatisfactory modulus of elasticity in bending of the resultant shaped article.

The talc contained in the propylene polymer composition of the present invention is in the form of fine particles having an average size of from 0.1 to 5 microns, preferably, from 0.1 to 3 microns. If the average size is less than 0.1 microns, it is difficult to uniformly disperse the talc particles in a matrix comprising the crystalline block copolymer and the amorphous copolymer by means of kneading. Also, an average size of more than 5 microns causes the resultant shaped article to exhibit an unsatisfactory lacquer-bonding property and appearance.

The amount of the talc in the propylene polymer composition comprising a mixture of the crystalline block copolymer with the amorphous copolymer and talc, is in the range of from 5% to 20% by weight. When the content of talc is less than 5% by weight, the resultant shaped article exhibits an unsatisfactory rigidity. If the content of talc is more than 20% by weight, the resultant shaped article exhibits an unsatisfactory resistance to mechanical impact at a low temperature. Conventional types of talc may be used for the present invention without pretreating. Otherwise, the talc particles may be coated with at least one member selected from organic titanate type coupling agents, silane type coupling agents, fatty acids, fatty acid metal salts, fatty acid esters, and fatty acid amides, to enhance the bonding property of the talc particles with the matrix consisting of the crystalline block copolymer and the amorphous copolymer and the dispersing property of the talc particles in the matrix.

In the preparation of the propylene polymer composition of the present invention, the crystalline block copolymer, the amorphous copolymer, and the talc are mixed at an elevated temperature of, for example, 180° C. to 240° C. by using a mixer, for example, Banbury mixer, heating roll mill, kneader, FCM, biaxial extruder or monoaxial extruder, preferably, Banbury's mixer.

The composition of the present invention may contain a small amount of one or more additives, for example, an antioxidant, an ultraviolet-ray-absorbing agent, a flame retardant, a pigment, a polymer for enhancing rigidity, an agent for enhancing lacquer-bonding property, a plasticizer, a lubricant, and an antistatic agent.

The antioxidant may consist of at least one member selected from the group consisting of 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylanilino)-2,4-bis-octyl-thio-1,3,5-triazine, n-octadecyl-3-(4'-hydroxy-3'5'-di-tert-butylphenyl) propionate, 2,6-di-tert-butyl-4-methylphenol (BHT), tris-(2-methyl-4-hydroxy-5-tert-butylphenyl) butane, tetrakis-[methylene 3-(3'5'-di-tert-butyl-4'-hydroxyphenyl) propionate]methane, 1,3,5-trimethyl-2,4,6-tris(3,5-di-tert-butyl-4-hydroxybenzyl) benzene, and dilaurylthiodipropionate.

The ultraviolet-ray-absorbing agent may consist of at least one member selected from the group consisting of 2-hydroxy-4-n-octoxybenzophenone, 2-hydroxy-4-octadecyloxybenzophenone, 4-dodecyloxy-2-hydroxybenzophenone, nickel-bis(o-ethyl-3,5-ditert-butyl-4-hydroxybenzyl) phosphonate, 2-hydroxy-4-n-octoxybenzophenone, 2-(2'-hydroxy-3'-tert-butyl-5'-methylphenyl)-5-chlorobenzotriazole, 2-(2'-hydroxy-3'5'-di-tert-butylphenyl)-5-chlorobenzotriazole, bis(2,6-dimethyl-4-piperidyl) sebacate, and bis(2,2,6,6-tetramethyl-4-piperidyl) sebacate.

The flame retardant may consist of at least one member selected from the group consisting of antimony trioxide, tricresyl phosphate, halogenated alkyltriazines, decabromodiphenyl ether, and chlorinated polyethylenes.

The pigment includes carbon black and titanium dioxide. A certain type of polymer, for example, high density polyethylene, crystalline propylene homopolymer, in an amount of 10% or less based on the entire weight of the composition is effective for enhancing the rigidity of the shaped article. Magnesium benzoate is effective as an agent for enhancing the lacquer-bonding property of the propylene polymer composition. The plasticizer may consist of a process oil, and the lubricant may consist of one or more fatty acid metal salts. Also, the antistatic agent may be a polyoxyethylene alkylether.

The shaped articles, for example, bumpers, can be produced by a conventional shaping process, for example, an injection molding process, from the propylene polymer composition of the present invention. The resultant shaped articles exhibit an excellent rigidity, resistance to impact at a low temperature, superior resistance to thermal deformation, and excellent lacquer-bonding property. Even if the propylene polymer composition of the present invention is shaped into a large dimension of articles, no flow mark is formed on the resultant article and the resultant article has a satisfactory appearance.

The specific examples presented below will serve to more fully elaborate how the present invention is practiced. However, it should be understood that these examples are only illustrative and in no way limit the scope of the present invention.

In the examples, the melt flow index was determined in accordance with ASTM D 1238, surface glossiness in accordance with ASTM D 523, tensile yield strength in accordance with ASTM D 638, modulus of elasticity in bending in accordance with ASTM D 790, and Izot impact strength in accordance with ASTM D 256, and the temperature of thermal deformation under a load of 4.6 kg/cm$^2$ in accordance with ASTM D648.

Also, the content of the fraction of the crystalline ethylene-propylene block copolymer, being soluble in p-xylene at the ambient (room) temperature, was determined by the following method. Five grams of the block copolymer was mixed into 500 ml of p-xylene, the mixture was heated until the block copolymer was completely dissolved in p-xylene, the resultant solution was left to stand in the ambient atmosphere for 24 hours so as to allow the solution to be cooled to an ambient temperature of about 23° C., and so as to allow an insoluble fraction thereof to precipitate from the solution. The precipitated fraction was separated from the solution by means of a centrifuge. The remaining p-xylene solution was mixed with 1500 ml of acetone. The resultant precipitate was separated from the solution by using a glass filter (G4). The separated precipitate was dried under vacuum and weighed.

EXAMPLE 1

A propylene polymer composition was prepared by mixing 20 parts by weight of a crystalline ethylene-propylene block copolymer, which will be represented by EP copolymer A hereinafter, in which the content of the polymerized ethylene was 8.0% by weight, in which the content of a fraction of the polypropylene component, being insoluble in boiling n-heptane was 97% by weight or more, in which the intrinsic viscosity of a fraction of the EP copolymer A, being soluble in p-xylene at the ambient temperature, was 2.5 to 4.0 determined in decahydronaphthalene at 135° C. and which had a melt flow index of 30; 43 parts by weight of another crystalline ethylene-propylene block copolymer, which will be represented by EP copolymer B hereinafter, in which the content of the polymerized ethylene was 9.0% of weight, in which the content of a fraction of the polypropylene component, being insoluble in boiling n-heptane is 97% by weight or more, in which the intrinsic viscosity of a fraction of the EP copolymer B, being soluble in p-xylene at the ambient temperature, was 2.5 to 4.0 determined in decahydronaphthalene at 135° C. and which has a melt flow index of 15; 27 parts by weight of an amorphous ethylene-propylene copolymer, which will be represented by EPR-A hereinafter, which had an intrinsic viscosity of 1.5 determined in decahydronaphthalene at 135° C. and a Mooney viscosity $ML_{1+4}$ (100° C.) of about 20 and which contained about 70% by weight of polymerized ethylene; 10 parts by weight of talc in the form of fine particles having an average size of 2 microns; 0.05 parts by weight of BHT; 0.3 parts by weight of tetrakis[methylene-3-(3',5'-di-tert-butyl-4'-hydroxyphenyl)propionate]methane and 0.3 parts by weight of nickel-bis(o-ethyl-3,5-di-tert-butyl-4-hydroxybenzyl)phosphonate, by using a Bunbury's mixer at a temperature of 180° C. for 12 minutes.

The resultant mixture was pelletized into pellets having a thickness of 1.5 mm and a length of 5.0 mm.

100 parts by weight of the pellets were mixed with 0.6 parts by weight of carbon black and the resultant mixture was melted in a monoaxial extruder at a cylinder temperature of the extruder of 220° C. to 240° C. and, extruded through extruding holes and the extruded mixture was pelletized into granules having a diameter of 1.5 mm and a length of 3.0 mm. The granules were converted into specimens for the measurements of the tensile yield strength, the modulus of elasticity in bending, the Izot impact strength, the temperature of thermal deformation and the surface glossiness.

The lacquer-bonding property of the specimen was represented by the lacquer-retaining percentage determined by the cross cut method.

The cross cut test was carried out in such a manner that a specimen was coated with an undercoating layer formed from a two liquid type acrylic-chlorinated polypropylene coating material and having a thickness of 10 microns and, then, coated with an overcoating layer having a thickness of 20 microns and formed from a two-liquid type acrylic-urethane coating material. The under-and over-coating layers were dried at a temperature of 80° C. for 30 minutes and, then, allowed to stand at an ambient temperature for 40 hours. A lacquer coating layer was formed on the surface of the specimen. The lacquer coating layer was cut by using a multi-cross cutter to form 100 squares having a length of 1 mm and a width of 1 mm. An adhesive sheet was adhered onto the surface of the cross-cut lacquer layer and rapidly pulled up at an angle of 45 degrees to the lacquer layer surface. These procedures were repeated twice. The number of the squares retained on the specimen was counted. The degree of the lacquer-bonding property of the specimen was represented by a percentage of the retained squares to 100 squares.

The flow mark-forming property of the propylene polymer composition was evaluated by the following method. Pellets consisting of the propylene polymer composition and carbon black were fed to an injection molding press and converted to a sheet having a length of 367 mm, a width of 143 mm, and a thickness of 2 mm measured at the terminal one point gate of the injection molding press, under the following conditions; a resin temperature of 250° C., an injection pressure of 1000 kg/cm², a mold temperature of 60° C., and a cycle time of 45 seconds, by using an MVSS mold. The opposite surface of the resultant sheet to the gate was observed so as to determine if flow marks were formed on the opposite surface.

The appearance of the shaped article was evaluated in the following manner. The pellets consisting of the propylene polymer composition and carbon black were shaped into bumpers having a length of 1.0 to 1.8 m, a width of 5 to 30 cm, and a thickness of 3 to 6 mm by using a large injection molding press.

Also, the melt flow index of the granulated mixture of the propylene polymer composition with carbon black was measured.

The results of the above-mentioned tests are indicated in Table 1.

EXAMPLES 2 and 3

In each of Examples 2 and 3, the same procedures as those described in Example 1 were carried out, except that the EPR-A was replaced, in Example 2, by another amorphous ethylene-propylene copolymer, which will be represented by EPR-B hereinafter, which had an intrinsic viscosity of 1.7 determined in decahydronaphthalene at 135° C. and a Mooney viscosity $ML_{1+4}$ (100° C.) of 40 and which contained about 70% by weight of polymerized ethylene and, in Example 3, by still another amorphous ethylene-propylene copolymer, which will be represented by EPR-C hereinafter, which had an intrinsic viscosity of 1.4 determined in decahydronaphthalene at 135° C. and a Mooney viscosity $ML_{1+4}$ (100° C.) of 10 and which contained 70% by weight of polymerized ethylene. The results of the tests are indicated in Table 1.

EXAMPLES 4 through 7

In each of Examples 4 through 7, the same procedures as those described in Example 1 were carried out, except that the EP copolymers A and B, the EPR-A, and talc were blended in the composition indicated in Table 1. The results of the tests are indicated in Table 1.

EXAMPLE 8

The same procedures as those described in Example 1 were carried out, except that 20 parts by weight of the EP copolymer A was replaced by 60 parts by weight of another crystalline ethylene-propylene block copolymer which will be represented by EP copolymer C hereinafter and in which the content of polymerized ethylene was 8.0% of weight, in which the content of the fraction of the polypropylene component insoluble in boiling n-heptane was 97% by weight or more, in which the intrinsic viscosity of the fraction of the EP copolymer C soluble in p-xylene at ambient temperature was 2.5 to 4.0 determined in decahydronaphthalene at 135° C., and in which the melt flow index was 50; no EP copolymer B was used; and the EPR-A was used in the amount of 30 parts by weight as indicated in Table 1. The results of the tests are indicated in Table 1.

The temperatures of thermal deformation of the propylene prolymer compositions of Examples 1 to 8 were 85° C. or more.

TABLE 1

| Item | Example No. 1 | 2 | 3 | 4 | 5 | 6 | 7 | 8 |
|---|---|---|---|---|---|---|---|---|
| Composition (part by weight) | | | | | | | | |
| EP copolymer A | 20 | 20 | 20 | 22 | 18 | 22 | 17 | — |
| EP copolymer B | 43 | 43 | 43 | 48 | 37 | 46 | 35 | — |
| EP copolymer C | — | — | — | — | — | — | — | 60 |
| EPR-A | 27 | — | — | 20 | 35 | 27 | 28 | 30 |
| EPR-B | — | 27 | — | — | — | — | — | — |
| EPR-C | — | — | 27 | — | — | — | — | — |
| Talc | 10 | 10 | 10 | 10 | 10 | 5 | 20 | 10 |
| Melt flow index (g/10 min.) | 10.1 | 8.8 | 11.2 | 10.7 | 9.6 | 11.5 | 8.0 | 14.0 |
| Surface glossiness | 85 | 85 | 85 | 82 | 82 | 88 | 81 | 84 |
| Tensile yield strength (kg/cm$^2$) | 170 | 166 | 167 | 192 | 160 | 181 | 150 | 168 |
| Modulus of elasticity in bending (kg/cm$^2$) | 11200 | 10800 | 11200 | 13200 | 9500 | 9200 | 12100 | 10800 |
| Izot impact strength (kg cm/cm)* −30° C. | 7.5 | 8.0 | 7.4 | 5.6 | 53.8 | 6.2 | 31.4 | 8.4 |
| Lacquer-bonding property (percent of remaining lacquer) | 100 | 100 | 100 | 100 | 100 | 100 | 100 | 100 |
| Appearance of shaped article (bumpr) | Good** | Good | Good | Good | Good | Good | Good | Good |
| General evaluation | Satisfactory | Satisfactory | Satisfactory | Satisfactory | Satisfactory | Satisfactory | Satisfactory | Satisfactory |

Note:
*The specimen used had a notch.
**Glossy. No flow mark was found on the surface.

COMPARATIVE EXAMPLE 1

The same procedures as those described in Example 1 were carried out, except that the EP copolymer A was replaced by 63 parts by weight of another ethylene-propylene block copolymer which will be represented by EP copolymer D hereinafter and in which the content of polymerized ethylene was 9.0% by weight, in which the content of the fraction of the polypropylene component insoluble in boiling n-heptane was 97% by weight or more, and in which the intrinsic viscosity of the fraction of the EP copolymer D soluble in p-xylene at room temperature was 2.5 to 4.0 determined in decahydronaphthalene at 135° C., and which had a melt flow index of 3; no EP copolymer B was used; and the EPR-A was replaced by the EPR-C. The results of the tests are indicated in Table 2.

COMPARATIVE EXAMPLE 2

The same procedures as those described in Example 1 were carried out except that the EPR-A was replaced by another amorphous ethylene-propylene copolymer which will be represented by EPR-D hereinafter, which had an intrinsic viscosity of 2.3 determined in decahydronaphthalene at 135° C. and a Mooney viscosity ML$_{1+4}$(100° C.) of 70, and which contained 70% by weight of polymerized ethylene. The results of the tests are shown in Table 2.

COMPARATIVE EXAMPLE 3

The same procedures as those described in Example 1 were carried out, except that the EP copolymers A and B and the EPR-A were used in the amounts indicated in Table 2. The results of the tests are shown in Table 2.

TABLE 2

| Item | Comparative Example No. 1 | 2 | 3 |
|---|---|---|---|
| Composition (part by weight) | | | |
| EP copolymer A | — | 20 | 24 |
| EP copolymer B | — | 43 | 43 |
| EP copolymer D | 63 | — | — |
| EPR-A | — | — | 15 |
| EPR-C | 27 | — | — |
| EPR-D | — | 27 | — |
| Talc | 10 | 10 | 10 |
| Melt flow index (g/10 min.) | 3.3 | 7.0 | 11.9 |
| Surface glossiness | 79 | 75 | 50 |
| Tensile yield strength (kg/cm$^2$) | 160 | 163 | 210 |
| Modulus of elasticity in bending (kg/cm$^2$) | 10700 | 11100 | 14700 |
| Izot impact strength (kg cm/cm) −30° C. | 10.0 | 9.0 | 4.8 |
| Lacquer-bonding property (percent of remaining lacquer) | 100 | 100 | 70 |
| Appearance of shaped article (bumper) | Unsatisfactory* | Unsatisfactory* Unsatisfactory** | |
| General evaluation | Unsatisfactory | Unsatisfactory | Unsatisfactory |

Note:
*Remarkable flow marks were found on the surface.
**No flow marks were found on the surface. The glossiness of the surface was poor.

We claim:
1. A propylene polymer composition comprising

(A) 40% to 75% by weight of at least one crystalline ethylene-propylene block copolymer in which the content of the polymerized ethylene is in the range of from 5% to 10% by weight, in which the polypropylene component has a fraction thereof insoluble in boiling n-heptane, in an amount of 97% or more based on the weight of said polypropylene component, in which a fraction of the block copolymer soluble in p-xylene at room temperature, has an intrinsic viscosity of from 2.5 to 4 determined in decahydronaphthalene at a temperature of 135° C. and which block copolymer has a melt flow index of from 11 to 70;

(B) 20% to 40% by weight of at least one amorphous ethylene-propylene copolymer having an intrinsic viscosity of from 1.0 to 2.0 determined in decahydronaphthalene at a temperature of 135° C., and a Mooney viscosity $ML_{1+4}$ of from 5 to 40 determined at a temperature of 100° C.; and (C) 5% to 20% by weight of talc in the form of fine particles having an average size of from 0.1 to 5 microns.

2. The composition as claimed in claim 1, which exhibits a melt flow index of at least 7.0.

3. The composition as claimed in claim 1, wherein said crystalline ethylene-propylene block copolymer has a melt flow index of 12 to 50.

4. The composition as claimed in claim 1, wherein the Mooney viscosity of said amorphous ethylene-propylene copolymer is in the range of from 10 to 40.

5. The composition as claimed in claim 1, wherein said talc fine particles have an average size of from 0.5 to 3 microns.

6. The composition as claimed in claim 1, wherein the amounts of said crystalline ethylene-propylene block copolymer and said amorphous ethylene-propylene copolymer are 45% to 70% by weight and 20% to 35% by weight, respectively.

* * * * *

UNITED STATES PATENT AND TRADEMARK OFFICE
CERTIFICATE OF CORRECTION

PATENT NO. : 4,439,573
DATED : March 27, 1984
INVENTOR(S) : Osamu Fukui, et al

It is certified that error appears in the above-identified patent and that said Letters Patent is hereby corrected as shown below:

On the title Page:

Change the Assignees to read as follows:

--UBE Industries, Ltd., Yamaguchi; Toyota Jidosha

Kabushiki Kaisha, Aichi, both of Japan

In Column 10:

Table 2, under column 3, insert --Unsatisfactory**-- under column 2, delete "Unsatisfactory**"

Signed and Sealed this

Ninth Day of October 1984

[SEAL]

Attest:

*Attesting Officer*

GERALD J. MOSSINGHOFF
*Commissioner of Patents and Trademarks*